UNITED STATES PATENT OFFICE.

OTTO SCHMIDT, OF MANNHEIM, GERMANY, ASSIGNOR TO BADISCHE ANILIN & SODA FABRIK, OF LUDWIGSHAFEN-ON-THE-RHINE, GERMANY, A CORPORATION.

AZO DYES AND PROCESS OF MAKING THE SAME.

1,075,305. Specification of Letters Patent. Patented Oct. 7, 1913.

No Drawing. Application filed September 19, 1911. Serial No. 650,216.

*To all whom it may concern:*

Be it known that I, OTTO SCHMIDT, subject of the King of Prussia, residing at Mannheim, Germany, have invented new and useful Improvements in Azo Dyes and Processes of Making the Same, of which the following is a specification.

I have discovered that I can obtain azo coloring matters which are eminently suited for use in the form of their lakes by combining a negatively substituted diazo compound with 1.3-diketo-hydro-inden

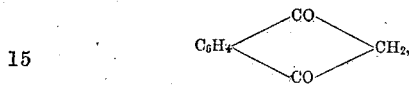

and instead of 1.3-diketo-hydro-inden, derivatives thereof may be employed. If the diketo-hydro-inden compound be employed in the form of its carboxylic acid, containing the carboxylic acid group in the cyclopentene ring, the carboxylic acid compound of the coloring matter is at first produced, the carboxylic acid group is, however, split off in the presence of acid, giving rise to the diketo-hydro-inden coloring matter. If a carboxylic acid ester of the diketo-hydro-inden be employed, the corresponding carboxylic acid ester of the coloring matter is at first produced, and this can be transformed into the non-carboxylated coloring matter by treatment with a saponifying agent. As instances of negatively substituted diazo compounds which can be used according to my invention, I mention those derived from the nitranilins, chloranilins, anilin-sulfonic acids, chlor-nitranilins, the corresponding naphthylamin compounds, amino-azo-benzene-disulfonic acid, nitro-amino-phenol-sulfonic acids, and the like.

My new coloring matters contain a residue corresponding to the formula

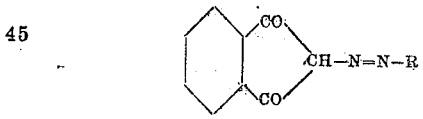

where R is an aromatic residue and are characterized by consisting when dry of yellow to brown powders which yield from orange to yellow solutions in concentrated sulfuric acid, yield yellow to red lake of excellent fastness against the action of light, and on reduction with stannous chlorid and hydrochloric acid give rise to a negatively substituted amin.

The following examples will serve to illustrate further the nature of my invention, which, however, is not confined to these examples. The parts are by weight.

Example 1: Diazotize one hundred and seventy-two and one-half parts of 3-chlor-6-nitranilin in the usual manner and allow the diazo solution to run into a dilute solution of one hundred and fifty parts of 1.3-diketo-hydro-inden which has been made acid with sulfuric acid and is maintained at from zero to five degrees centigrade. When the combination is complete, filter off the greenish yellow dye which is practically insoluble in water, alcohol and oil, and yields a greenish yellow lake of excellent fastness against the action of light.

Example 2: Diazotize one hundred and seventy-three parts of sulfanilic acid and introduce the suspension into a dilute solution containing one hundred and fifty parts of 1.3-diketo-hydro-inden and two hundred and fifty parts of calcined soda, while maintaining the temperature at from zero to five degrees centigrade. When the combination is complete, salt out the coloring matter, which consists of a yellow powder which dyes wool from an acid bath greenish yellow shades. Its barium lake is brilliant greenish yellow.

Example 3: Diazotize two hundred and twenty-three and one-half parts of 4-chlor-2-amino-phenol-6-sulfonic acid in the usual manner and introduce the suspension into an aqueous solution of one hundred and fifty parts of 1.3-diketo-hydro-inden, which is maintained alkaline by means of sodium carbonate and the temperature of which lies between zero and five degrees centigrade. When the combination is complete, salt out the coloring matter, which consists of a brown powder and which dyes wool from an acid bath yellow, which shades, on treatment with bichromate, turn bordeaux.

Example 4: Diazotize one hundred and seventy-two and one-half parts of 3-chlor-6-nitranilin and allow the solution to run into an ice-cold solution of two hundred and fifty-two parts of the disodium salt of 1.3-diketo-hydro-inden-2-carboxylic acid, which has been acidified with sulfuric acid. At first a light yellow precipitate is formed and later an intense greenish yellow precipitate, and at the same time carbon dioxid is evolved. Stir for about eight hours and filter off the coloring matter which gives rise to greenish yellow lakes of excellent fastness against the action of light. If, in this example, the disodium salt of 1.3-diketo-hydro-inden-2-carboxylic acid be replaced by an equivalent quantity of the sodium salt of the ethyl ester of 1.3-diketo-hydro-inden-2-carboxylic acid, a light yellow product is at first obtained which upon warming with alkili yields the free carboxylic acid, which upon treatment with acid gives the coloring matter.

Example 5: Diazotize one hundred and sixty-two parts of 2.5-dichlor-anilin in the usual manner and allow the solution to run into an aqueous solution of one hundred and forty-five parts of 1.3-diketo-hydro-inden to which an excess of sodium acetate has been added and which is maintained at from zero to five degrees centigrade. When the combination is complete, filter off the yellow coloring matter which is practically insoluble in water, alcohol and oil, and which gives rise to greenish yellow lakes of excellent fastness against the action of light. It possesses a constitution corresponding to the formula

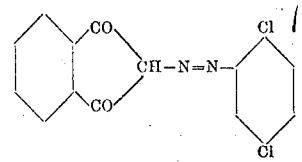

In a manner similar to those described in the foregoing examples, other diazo compounds derived from negatively substituted amins and also derivatives of 1.3-diketo-hydro-inden can be employed.

The following table gives the properties of some of the coloring matters obtainable according to my invention:

| Coloring matter from 1.3-diketo-hydro-inden and the diazo compound from— | Solution in water. | Shade on wool. | Color of the barium-aluminium lake. | Color of the direct lake. |
|---|---|---|---|---|
| Ortho-nitranilin | Insoluble | | | Yellow. |
| 4-Chlor-2-nitranilin | do | | | Do. |
| 3-Chlor-6-nitranilin | do | | | Greenish yellow. |
| 3-Nitro-4-amino-toluene | do | | | Orange-yellow. |
| 2.4-Dinitranilin | do | | | Greenish yellow. |
| Metanilic acid | Yellow | Greenish yellow | Yellow | |
| Sulfanilic acid | do | do | Greenish yellow | |
| 3-Chlor-anilin-4-sulfonic acid | do | Yellow | do | |
| 1-Naphthylamin-4-sulfonic acid | Orange | Orange | Red | |
| 2-Naphthylamin-6-sulfonic acid | do | do | Yellow-orange | |
| Amino-azo-benzene-disulfonic acid | do | do | Orange | |
| 4-Chlor-2-amino-phenol-6-sulfonic acid | Bordeaux red | Yellow | | |
| 6-Nitro-2-amino-phenol-4-sulfonic acid | Pure red | Red | | |

Now what I claim is:—

1. The process of producing azo coloring matter by combining a negatively substituted diazo compound with a 1.3-diketo-hydro-inden body.

2. The process of producing azo coloring matter by combining diazotized 2.5-dichlor-anilin with 1.3-diketo-hydro-inden.

3. As new articles of manufacture the azo coloring matters which can be obtained by combining a negatively substituted diazo compound with a 1.3-diketo-hydro-inden body, which coloring matters contain a residue corresponding to the formula

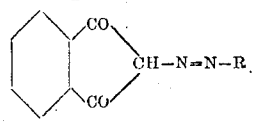

where R is an aromatic residue and consist, when dry, of yellow to brown powders, yield from yellow to orange solutions in concentrated sulfuric acid, yield yellow to red lakes of excellent fastness against the action of light, and on reduction with stannous chlorid and hydrochloric acid give rise to a negatively substituted amin.

4. As a new article of manufacture the azo coloring matter which can be obtained by combining diazotized 2.5-dichlor-anilin with 1.3-diketo-hydro-inden, which coloring matter possesses a constitution corresponding to the formula

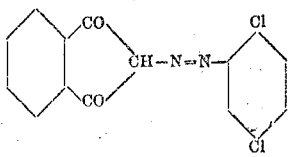

consists, when dry, of a yellow powder, yields an orange-red solution in concentrated sulfuric acid, yields a greenish yellow lake of excellent fastness against the action of light, and which upon reduction with stannous chlorid and hydrochloric acid gives rise to 2.5-dichlor-anilin.

In testimony whereof I have hereunto set my hand in the presence of two subscribing witnesses.

OTTO SCHMIDT.

Witnesses:
J. ALEC. LLOYD,
JOSEPH HAEFFER.